United States Patent

Washington

[11] Patent Number: 5,308,882
[45] Date of Patent: May 3, 1994

[54] PREPARATION OF POLYURETHANE FOAM WITHOUT A TERTIARY AMINE CATALYST

[75] Inventor: Debra A. Washington, Austin, Tex.

[73] Assignee: Texaco Chemical Company, White Plains, N.Y.

[21] Appl. No.: 117,273

[22] Filed: Sep. 7, 1993

[51] Int. Cl.$^5$ .............................. C08G 18/14
[52] U.S. Cl. ............................ 521/115; 521/118; 521/164; 521/167
[58] Field of Search ............ 521/164, 167, 115, 118

[56] References Cited

U.S. PATENT DOCUMENTS 4,282,330  8/1981  Austin ............................ 521/118

*Primary Examiner*—Morton Foelak
*Attorney, Agent, or Firm*—James L. Bailey; Kenneth R. Priem

[57] ABSTRACT

This invention is a molded flexible polyurethane foam containing acid-modified polyoxypropyleneamine comprising a polyol, a polyisocyanate, water, and a crosslinker/catalyst of the formulae:

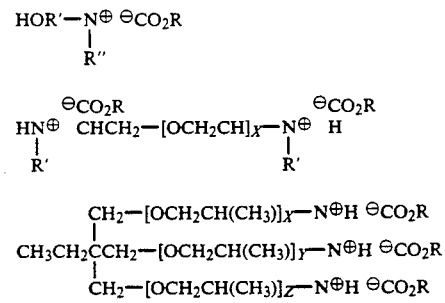

where R' is an alkylene radical having from about 2 to 4 carbon atoms, R" is H or OH and R is H or from about 1 to 6 carbon atoms wherein said compound is present in an amount ranging from about 0.05 to 2.00 weight percent based on the combined weight of the polyol and polyisocyanate and wherein the sole blowing agent is $CO_2$ resulting from the reaction of the water and the isocyanate or wherein auxiliary blowing agents may also be included and are selected from the group consisting of halogenated low-boiling hydrocarbons (e.g. trichloromono-fluoromethane and dichloromethane), carbon dioxide, and nitrogen or mixtures thereof.

This invention is also a method of preparing a flexible polyurethane product wherein a polyol, a polyisocyanate and water are reacted in a closable mold or are free rising, wherein the improvement comprises incorporating in the reaction a compound of the formulae as shown above.

15 Claims, No Drawings

PREPARATION OF POLYURETHANE FOAM WITHOUT A TERTIARY AMINE CATALYST

BACKGROUND OF THE INVENTION

1. Field of the Invention

This invention relates to a formulation containing polyoxypropyleneamine partially neutralized with carboxylic acid which is devised for the preparation of flexible polyurethane foam without the use of a tertiary amine catalyst. These acid-modified polyoxypropyleneamines can also replace tertiary amine catalyst in all-water blown formulations for flexible foam.

2. Background Information

It is common knowledge among those skilled in the art that tertiary amine catalysts have to date played an indispensible role in the production of flexible foam. Many researchers are presently working to devise flexible foam formulations which require no hazardous volatile organic chemical blowing agents, and many are pursuing this effort by proposing formulations which use $CO_2$ produced from the water-isocyanate reaction as the sole blowing agent.

U.S. Pat. No. 4,282,330 reveals the incorporation of formic acid modified low equivalent weight amino polyols as crosslinkers in molded polyether polyurethane semiflexible foams. In '330, an auxiliary tertiary amine(s) is used to catalyze the foam reaction(s). In the instant invention, no auxiliary tertiary amine was used, only the acid-modified secondary amine. In the instant invention, the acid-modified polyoxypropyleneamines may act as both crosslinker and catalyst in the foam reaction.

SUMMARY OF THE INVENTION

This invention is a molded flexible polyurethane foam containing acid-modified polyoxypropyleneamine comprising a polyol, a polyisocyanate, and water wherein the improvement comprises using as the sole catalyst a compound of the formula:

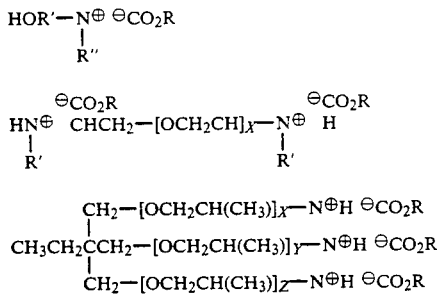

where R' is an alkylene radical having from about 2 to 4 carbon atoms, R" is H or OH and R is H or from about 1 to 6 carbon atoms wherein said compound is present in an amount ranging from about 0.05 to 2.00 weight percent based on the combined weight of the polyol and polyisocyanate and wherein the sole blowing agent is $CO_2$ resulting from the reaction of the water and the isocyanate or wherein auxiliary blowing agents may also be used and are selected from the group consisting of halogenated low-boiling hydrocarbons (e.g. trichloromono-fluoromethane and dichloromethane), carbon dioxide, and nitrogen or mixtures thereof.

This invention is also a method of preparing a flexible polyurethane product wherein a polyol, a polyisocyanate and water are reacted in a closable mold or are free rising, wherein the improvement comprises incorporating in the reaction a compound of the formulae shown above.

DESCRIPTION OF THE PREFERRED EMBODIMENT

This invention allows for elimination of conventional tertiary amine catalysts from flexible foam formulations and for the elimination of volatile organic chemical blowing agents from flexible foam formulations.

This invention eliminates the toxicity and odor problems associated with the use of conventional tertiary amine catalysts in flexible foam formulations. This invention also reduces the cost of flexible foam production since costly government permits required for the use of volatile organic chemical blowing agents need not be secured. In general, this invention provides for a method of production of flexible foam which is significantly more environmentally safe than those commonly used.

Polyurethanes are polymers which contain urethane linkages and are prepared by reaction between a polyol and a diisocyanate. The polyol is itself a low-molecular-weight (mol wt is about 1000) polymer with hydroxyl end groups; the diisocyanate is often toluene diisocyanate.

A number of different kinds of polyurethanes are produced, depending on the nature of the polyol used and on the degree of cross-linking achieved.

One major use of polyurethanes is in the stretchable fibers used for bathing suits and leotards. These polyurethanes have a rather low degree of cross-linking so that the resulting polymer is soft and elastic. A second major use of polyurethanes is in foams. Foaming occurs when a small amount of water is added during polymerization. Water adds to isocyanate groups giving carbamic acids, which spontaneously lose $CO_2$, thus generating the foam bubbles.

Polyurethane foams generally have a higher amount of cross-linking than do polyurethane fibers, an amount that can be varied by using a polyalcohol (rather than a diol) as one of the reactive components. The result is a rigid but very light foam suitable for use as thermal insulation in building construction and in portable ice chests. Flexible foam uses include furniture, bedding and automotive applications.

One type of polyol useful in making polyurethanes is a polyether polyol. Polyurethane foams are produced by conducting the reaction between the polyether polyol component and the organic polyisocyanate component catalytically in the presence of water and optionally an inert blowing agent.

The polyether polyol component, the organic polyisocyanate, water and catalyst are all brought together simultaneously and allowed to react, foam and cure in the mold without any additional high temperature curing step. An appropriate temperature range is from about 20° to 30° C. and an appropriate pressure range is from about 0.8 to 1.2 atmosphere. The preferred temperature is about 25° C. and the preferred pressure is about 1 atm.

The polyether polyol component may be a polyol having a functionality of from about two to six and an equivalent weight of about 1,000.

The polyether polyols useful in the practice of my invention are prepared by a well known process which involves the reaction of the polyhydric initiator such as trimethylolpropane, glycerol, 1,2,6-hexane triol, sorbitol, pentaerythritol, and the like, with a lower alkylene oxide such as propylene oxide and butylene oxide, mixtures thereof, or mixtures of ethylene oxide with propylene oxide and/or butylene oxide. This reaction is carried out in a well known manner with an alkoxylation catalyst, generally an alkali metal hydroxide such as potassium hydroxide. The reaction is continued until the product of an approximate desired molecular weight is obtained. It is necessary to then react the product made as described above with ethylene oxide in order to acquire primary hydroxyl group termination of the polyether chains. This process is described in U.S. Pat. No. 3,336,242 for example. The percentage of primary hydroxyl groups terminating the polyether chain is generally increased by an addition of ethylene oxide alone; however, it will be understood that ethylene oxide mixed with some proportions of propylene oxide will also achieve this result. Also, a polyether polyol is useful which may have blocked segments of different alkylene oxides in the molecule and not solely limiting such segments of ethylene oxide to the terminal positions.

While higher functionality polyether polyols may be used, it is especially preferred to use triols having molecular weights of from about 3,000 to 4,500 and can be used to produce an acceptable flexible polyurethane foam.

Useful polyether diols are, for example, polypropylene glycols or mixed polypropylene glycol/polyethylene glycol copolymers having a molecular weight of from about 3,000 to 5,000. These materials are produced by reacting ethylene oxide, propylene oxide, or a butylene oxide either sequentially or in admixture with an initiator such as, for example, ethylene glycol, propylene glycol or butylene glycol.

The organic polyisocyanates useful are those prepared by the phosgenation of the reaction product between aniline and formaldehyde having a functionality of 2.2 or greater. While functionalities around four and above are possible, they are not readily attainable by known processes. It is preferred to use isocyanates having functionalities of from about 2.2 to 3.5 and an especially preferred range is between 2.2 and 2.8. Isocyanates are produced by phosgenating amine precursors formed in the process described in U.S. Pat. Nos. 2,683,730 and 3,362,979, for example.

The foams of my invention also contain a reactive crosslinker which serves additionally as the reaction catalyst. Herein, the crosslinker/catalyst is referred to as a catalyst. Useful catalysts include low equivalent weight amino polyols which have been reacted with a carboxylic acid. Use of these novel catalysts results in lower free rise density, lower molded density, better moldability and decreased usage (weight) per molded part. The novel catalysts of my invention include compounds of the formulae:

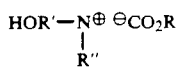

where R' is an alkylene radical having from about 2 to 4 carbon atoms, R" is H or OH and R is H or from about 1 to 6 carbon atoms with R = H is preferred.

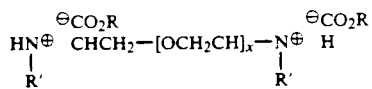

where R' is an alkyl radical having from about 1 to 4 carbon atoms, x is approximately 2.6, 5.6, and 33.1 to correspond with JEFFAMINE D-230, D-400, and D-2000 respectively, and R is H or from about 1 to 6 carbon atoms with R = H is preferred.

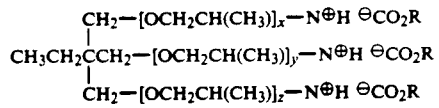

where x+y+z is about 5.3 to correspond with JEFFAMINE T-403 and R is H or from about 1 to 6 carbon atoms with R = H is preferred.

Useful low molecular weight amino polyols include the Mannich condensate of phenol, formaldehyde and diethanolamine; triethanolamine and generally any polyhydroxytertiary amino compound. The Mannich condensate using diethanolamine is preferred.

Any carboxylic acid is included in the scope of the invention including formic acid, 2-ethyl hexanoic acid, acetic and, glycolic acid, adipic acid, succinic acid, and similar acids. Formic acid is preferred.

The polyol component and the organic isocyanate component are mixed in the reaction mixture in such proportions that the ratio of isocyanato groups to hydroxyl groups, commonly known as isocyanate index, is from about 0.85 to 1.15 with an especially preferred isocyanate index being about 1.05. The ratio of isocyanato groups to hydroxyl groups includes also any water that is present in the foamable reaction mixture.

In a preferred embodiment of my invention water is used to produce the $CO_2$ blowing agent. It is preferred to use about one to four parts by weight of water per 100 parts of the polyol component. The especially preferred range is from about 1.5 to 2.5 parts by weight per 100 parts of the polyol component.

Although the novel crosslinkers of this invention usually eliminate the need for further tertiary amine catalyst, other amine catalysts normally employed in polyurethane foams may be used. My invention will require an organometallic catalyst, but eliminates the need for traditional tertiary amine catalyst, since the tertiary amine catalyst is incorporated in crosslinker.

A partial list of useful tertiary amines include trialkylamines (e.g. trimethylamine, triethylamine), heterocyclic amines, such as N-alkylmorpholines (e.g., N-methylmorpholine, N-ethylmorpholine, etc.), 1,4 dimethylpiperazine, triethylenediamine, etc., aliphatic polyamides, such as N,N,N',N'-tetramethyl-1,3-butadiamine.

A partial list of organic tin compounds used as catalysts which are particularly useful in making flexible foams may suitably be a stannous salt of a carboxylic acid, a trialkyltin oxide, a dialkyltin dihalide, a dialkyltin oxide, etc., wherein the organic groups of the organic portion of the tin compound are hydrocarbon groups containing from about 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoacte, stannous oleate, etc., or a mixture thereof.

The catalysts useful in the preparation of polyether polyurethane foams described herein, based on the combined weight of the polyol and of the polyisocyanate, are employed in an amount of from about 0.05 to 2.00 weight percent. Preferably, the amount of catalyst used is from about 0.5 to 1.0 weight percent.

Conventional formulation ingredients may also be employed as needed, such as, for example, foam stabilizers also known as silicone oils or emulsifiers. The foam stabilizer may be an organic silane or siloxane. For example, compounds may be used having the formula:

$$RSi-[O-(RSiO)_n-(oxyalkylene)_mR]_3$$

wherein R is an alkyl group containing from about 1 to 4 carbon atoms; n is an integer of from about 4 to 8; m is an integer of from about 20 to 40; and the oxyalkylene groups are derived from propylene oxide and ethylene oxide. See, for example, U.S. Pat. No. 3,194,773.

It is within the scope of the present invention to utilize an extraneously added inert blowing agent such as a gas or gas-producing material. For example, halogenated low-boiling hydrocarbons, such as trichloromonofluoromethane and dichloromethane, carbon dioxide, nitrogen, etc., may be used. The inert blowing agent reduces the amount of excess isocyanate and water that is required in preparing flexible urethane foam. Selection of the proper blowing agent is well within the knowledge of those skilled in the art. See for example U.S. Pat. No. 3,072,082.

Fire retardants that can be incorporated into the components are of two types. The first of these are those that are incorporated by mere mechanical mixing and include, for example, tris(chloroethyl)phosphate, tris(2,3-dibromopropyl)phosphate, diammonium phosphate, halogenated compounds and antimony oxide. One preferred mechanically mixed fire retardant is tribetachloropropylphosphate also known as Firemaster ® 642. The second type of fire retardant are those that become chemically bound in the polymer chain. An example of this type of fire retardant includes chlorendic acid derivatives and various phosphorous-containing polyols.

The following examples which illustrate the instant invention are not intended to be limitative.

EXAMPLES 1-5

The examples contained in the following table illustrate the use of polyoxypropyleneamine salts in polyether flexible foam formulations. Example 1 shows that flexible foam having reasonable ILD values can be obtained without the use of tertiary amine catalysts. Example 2 demonstrates the range of TDI indexes, i.e., the softness of foams which may be obtained using polyoxypropyleneamine salts. The utility of the salts in all-water blown formulations is shown in Example 3, while Example 4 illustrates the parts-by-weight range in which the polyoxypropyleneamine salts may be used without significantly affecting the quality of the foam. Example 5 is a comparative blank containing no polyoxypropyleneamine salt. All examples represent formulations which were mechanically mixed at approximately 4000 rpm and allowed to rise freely.

DEFINITION OF TERMS FOR TABLE

Cream time is the time between the discharge of the foam ingredients into the mixing head and the beginning of the foam rise.

Rise time is the time between discharge of the foam ingredients and the point at which the foam rise is complete.

ILD (Indentation Load Deflection) is a measure of the load-bearing ability of the foam. Standard test is to depress a 50 sq in indentor circular foot into the foam and determine the number of pounds or kilograms required to achieve a desired deflection.

firemaster 642 is tribetachloropropylphosphate
Poly G 32-56 is polyether polyol
Goldschmidt B-8231 is a silicone surfactant/stabilizer.
Dabco T-9 is a metal catalyst as described in patent
TDI is toluene diisocyanate
TDI Index indicates the amount of TDI available for reaction with the polyol and water. An index of 105 indicates that there is a 5% excess TDI available over the stoichiometric amount required by the polyol and water.

TABLE

| Example | parts by weight | | | | |
| --- | --- | --- | --- | --- | --- |
|  | 1 | 2 | 3 | 4 | 5* |
| Poly G 32-56 | 100 | 100 | 100 | 100 | 100 |
| Goldschmidt B-8231 | 1.3 | 1.3 | 1.15 | 1.3 | 1.3 |
| Water | 5.1 | 5.1 | 5.1 | 5.1 | 5.1 |
| Methylene dichloride | 5.0 | 5.0 | 0.0 | 5.0 | 5.0 |
| Firemaster 642 | 9.0 | 9.0 | 9.0 | 9.0 | 9.0 |
| Dabco T-9 | 0.25 | 0.25 | 0.25 | 0.25 | 0.25 |
| JEFFAMINE D-230A | 0.5 | 0.5 | 0.5 | 1.0 | 0.0 |
| TDI | 63.55 | 52.46 | 63.55 | 63.55 | 63.5 |
| TDI Index | 1.11 | 0.92 | 1.11 | 1.10 | 1.11 |
| cream time, sec | 12 | 14 | 12 | 12 | 12 |
| rise time, sec | 115 | 132 | 106 | 109 | 134 |
| Density, pcf | 1.20 | 1.21 | 1.19 | 1.19 |  |
| ILD 25% | 31.0 | 24.0 | 33.0 | 30.0 |  |
| ILD 65% | 60.0 | 47.0 | 69.0 | 60.0 |  |
| ILD 25% R | 16.0 | 14.6 | 16.0 | 15.0 |  |
| Ball Rebound, % | 28 | 25 | 25 | 22 |  |

*This formulation produced very poor quality foam which was not tested for physical properties.
where:
JEFFAMINE D-230A has the following formula:

$$HOR'-\overset{\underset{|}{R''}}{N^{\oplus}}\ominus CO_2R$$

and R' is an alkylene radical having from about 2 to 4 carbon atoms, R'' is H or OH and R is H or from about 1 to 6 carbon atoms with R = H is preferred.

We claim:

1. In a method of preparing a flexible foamed polyurethane product wherein a polyol, a polyisocyanate and water are mixed under reaction conditions, the improvement which comprises:
incorporating as the sole catalyst in the reaction a compound of the formula:

$$HOR'-\overset{\underset{|}{R''}}{N^{\oplus}}\ominus CO_2R$$

where R' is an alkylene radical having from about 2 to 4 carbon atoms, R'' is H or OH and R is H or from about 1 to 6 carbon atoms wherein said compound is present in an amount ranging from about 0.05 to 2.00 weight percent based on the combined weight of the polyol and polyisocyanate.

2. The method of claim 1 wherein R is H in the catalyst.

3. The method of claim 1 wherein the catalyst is present in an amount ranging from about 0.5 to 1.0 weight percent based on the combined weight of the polyol and polyisocyanate.

4. The method of claim 1 wherein the polyisocyanate is toluene diisocyanate.

5. The method of claim 1 wherein the sole blowing agent is carbon dioxide resulting from the reaction of the water and the isocyanate.

6. In a method of preparing a flexible foamed polyurethane product wherein a polyol, a polyisocyanate and water are mixed under reaction conditions, the improvement which comprises:
incorporating as the sole catalyst in the reaction a compound of the formula:

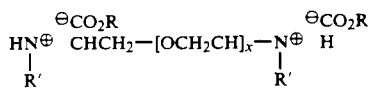

where R' is an alkyl radical having from about 1 to 4 carbon atoms, x is approximately 2.6, 5.6, and 33.1 and R is H or from about 1 to 6 carbon atoms wherein said compound is present in an amount ranging from about 0.05 to 2.00 weight percent based on the combined weight of the polyol and polyisocyanate.

7. The method of claim 6 wherein R is H in the catalyst.

8. The method of claim 6 wherein the catalyst is present in an amount ranging from about 0.5 to 1.0 weight percent based on the combined weight of the polyol and polyisocyanate.

9. The method of claim 6 wherein the polyisocyanate is toluene diisocyanate.

10. The method of claim 6 wherein the sole blowing agent is carbon dioxide resulting from the reaction of the water and the isocyanate.

11. In a method of preparing a flexible foamed polyurethane product wherein a polyol, a polyisocyanate and water are mixed under reaction conditions, the improvement which comprises:
incorporating as the sole catalyst in the reaction a compound of the formula:

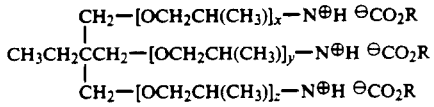

where $x+y+z$ is about 5.3 and R is H or from about 1 to 6 carbon atoms wherein said compound is present in an amount ranging from about 0.05 to 2.00 weight percent based on the combined weight of the polyol and polyisocyanate.

12. The method of claim 11 wherein R is H in the catalyst.

13. The method of claim 11 wherein the catalyst is present in an amount ranging from about 0.5 to 1.0 weight percent based on the combined weight of the polyol and polyisocyanate.

14. The method of claim 11 wherein the polyisocyanate is toluene diisocyanate.

15. The method of claim 11 wherein the sole blowing agent is carbon dioxide resulting from the reaction of the water and the isocyanate.

* * * * *